United States Patent
Park et al.

(10) Patent No.: US 12,518,424 B2
(45) Date of Patent: Jan. 6, 2026

(54) METHOD AND APPARATUS WITH CALIBRATION

(71) Applicant: Samsung Electronics Co., Ltd., Suwon-si (KR)

(72) Inventors: Daeul Park, Suwon-si (KR); Jaewoo Lee, Hwaseong-si (KR); Kapje Sung, Yongin-si (KR); Dongwook Lee, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 973 days.

(21) Appl. No.: 17/669,760

(22) Filed: Feb. 11, 2022

(65) Prior Publication Data

US 2022/0366604 A1 Nov. 17, 2022

(30) Foreign Application Priority Data

May 12, 2021 (KR) .......................... 10-2021-0061237

(51) Int. Cl.
*G06T 7/80* (2017.01)
*G06T 7/246* (2017.01)
(Continued)

(52) U.S. Cl.
CPC ................ *G06T 7/80* (2017.01); *G06T 7/248* (2017.01); *G06T 7/33* (2017.01); *G06T 7/50* (2017.01);
(Continued)

(58) Field of Classification Search
None
See application file for complete search history.

(56) References Cited

U.S. PATENT DOCUMENTS

2016/0176343 A1 6/2016 Sakano et al.
2020/0125862 A1* 4/2020 Lee ....................... G06V 20/588

FOREIGN PATENT DOCUMENTS

CN 111968074 A * 11/2020
CN 118608628 A * 9/2024
(Continued)

OTHER PUBLICATIONS

Hold, Stephanie, et al. "Efficient and robust extrinsic camera calibration procedure for lane departure warning." 2009 IEEE Intelligent Vehicles Symposium. IEEE, 2009., (6 pages in English).

(Continued)

*Primary Examiner* — Fan Zhang
(74) *Attorney, Agent, or Firm* — NSIP Law (57) ABSTRACT

A processor-implemented method with calibration includes: detecting a preset pattern comprised in a surface of a road from a driving image of a vehicle; transforming image coordinates in an image domain of the pattern into world coordinates in a world domain; determining whether to calibrate a camera capturing the driving image by comparing a size predicted based on the world coordinates of the pattern and a reference size of the pattern; in response to a determination to calibrate the camera, determining relative world coordinates of the pattern with respect to a motion of the camera, using images captured by the camera at different time points; transforming the relative world coordinates of the pattern into absolute world coordinates of the pattern; and calibrating the camera using a corresponding relationship between the absolute world coordinates of the pattern and the image coordinates of the pattern.

20 Claims, 5 Drawing Sheets (51) Int. Cl.
  *G06T 7/33* (2017.01)
  *G06T 7/50* (2017.01)
  *G06T 7/73* (2017.01)
  *G06V 20/56* (2022.01)
  *H04N 17/00* (2006.01)
  *H04N 23/61* (2023.01)

(52) U.S. Cl.
  CPC .............. *G06T 7/74* (2017.01); *G06V 20/588* (2022.01); *H04N 17/002* (2013.01); *H04N 23/61* (2023.01); *G06T 2207/30244* (2013.01); *G06T 2207/30256* (2013.01)

(56) References Cited

FOREIGN PATENT DOCUMENTS

| EP | 2775257 B1 | * | 3/2020 |
|---|---|---|---|
| JP | 2013518298 A | * | 5/2013 |
| JP | 5552892 B2 | | 7/2014 |
| KR | 10-1245529 B1 | | 3/2013 |
| KR | 10-1380318 B1 | | 4/2014 |
| KR | 10-2014-0090872 A | | 7/2014 |
| KR | 10-2015-0097251 A | | 8/2015 |
| KR | 10-1969030 B1 | | 4/2019 |
| KR | 10-2060113 B1 | | 12/2019 |
| KR | 10-2020-0070702 A | | 6/2020 |
| KR | 10-2020-0135606 A | | 12/2020 |
| WO | WO 2017/122552 A1 | | 7/2017 |

OTHER PUBLICATIONS

Fung, George Shiu Kai, et al., "Camera calibration from road lane markings." Optical Engineering 42.10 (2003): 2967-2977.

Guiducci, Antonio. "Camera calibration for road applications." Computer vision and image understanding 79.2 (2000): 250-266.

Lu, Yuwei, et al., "Forward vehicle collision warning based on quick camera calibration." 2018 IEEE International Conference on Acoustics, Speech and Signal Processing (ICASSP). IEEE, 2018., (5 pages in English).

Chira, Ioana Maria, et al., "Real-time detection of road markings for driving assistance applications." The 2010 International Conference on Computer Engineering & Systems. IEEE, 2010., p. 158-163.

Extended European search report issued on Nov. 16, 2022, in counterpart European Patent Application No. 22172839.7 (9 pages in English).

* cited by examiner

METHOD AND APPARATUS WITH CALIBRATION

CROSS-REFERENCE TO RELATED APPLICATIONS

This application claims the benefit under 35 USC § 119(a) of Korean Patent Application No. 10-2021-0061237, filed on May 12, 2021 in the Korean Intellectual Property Office, the entire disclosure of which is incorporated herein by reference for all purposes.

BACKGROUND

1. Field

The following description relates to a method and apparatus with calibration.

2. Description of Related Art

Cameras may be used in various fields including, for example, autonomous driving (AD) and advanced driver assistance systems (ADAS). When a camera is provided in a vehicle, camera calibration may be basically performed. Through camera calibration, coordinate system transformation information for transforming a coordinate system between the vehicle and the camera may be obtained. The coordinate system transformation information may be used to implement various functions for AD and ADAS, for example, a function of estimating a pose of the vehicle and a function of estimating a distance to a vehicle ahead.

However, when deformation occurs in an initial state where the calibration is performed due to, e.g., a change in tire air pressure, a change in vehicle pose, a change in the number of passengers on board, and the like, a position or angle of the camera may change, and there may thus be a difference between information of an actual environment and information determined based on an image of the environment captured using the camera.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented method with calibration includes: detecting a preset pattern comprised in a surface of a road from a driving image of a vehicle; transforming image coordinates in an image domain of the pattern into world coordinates in a world domain; determining whether to calibrate a camera capturing the driving image by comparing a size predicted based on the world coordinates of the pattern and a reference size of the pattern; in response to a determination to calibrate the camera, determining relative world coordinates of the pattern with respect to a motion of the camera, using images captured by the camera at different time points; transforming the relative world coordinates of the pattern into absolute world coordinates of the pattern; and calibrating the camera using a corresponding relationship between the absolute world coordinates of the pattern and the image coordinates of the pattern.

The determining the relative world coordinates of the pattern may include: determining motion information of the camera based on a corresponding relationship between patterns in the images captured by the camera at the different time points; and determining the relative world coordinates of the pattern with respect to the motion of the camera using the corresponding relationship between the patterns and the motion information.

The transforming the relative world coordinates of the pattern into the absolute world coordinates may include, in response to the pattern having the reference size, transforming the relative world coordinates into the absolute world coordinates using the reference size.

The transforming the relative world coordinates of the pattern into the absolute world coordinates may include, in response to the pattern having a reference range, transforming the relative world coordinates into the absolute world coordinates based on a motion of the vehicle.

The calibrating the camera may include calibrating any one or any combination of any two or more of a pitch, a roll, and a height of the camera using the corresponding relationship between the absolute world coordinates of the pattern and the image coordinates of the pattern.

The preset pattern may include a standardized road mark comprised in the road on which the vehicle is traveling.

The transforming the image coordinates of the pattern into the world coordinates may include transforming the image coordinates of the pattern into the world coordinates based on a homography matrix.

The transforming the image coordinates of the pattern into the world coordinates may include transforming the image coordinates of the pattern into the world coordinates based on a parameter of the camera and a constraint that the pattern is on the surface of the road.

The determining whether to calibrate the camera may include determining whether to calibrate the camera based on whether a difference between the predicted size of the pattern and the reference size exceeds a preset threshold.

The method may include determining whether a preset number of feature points are extracted from the preset pattern.

The method may include estimating either one or both of a pose of the vehicle and a distance to another vehicle, based on an image captured using the calibrated camera.

In another general aspect, one or more embodiments include a non-transitory computer-readable storage medium storing instructions that, when executed by a processor, configure the processor to perform any one, any combination, or all operations and methods described herein.

In another general aspect, an apparatus with calibration includes: one or more processors configured to: detect a preset pattern comprised in a surface of a road from a driving image of a vehicle; transform image coordinates in an image domain of the pattern into world coordinates in a world domain; determine whether to calibrate a camera capturing the driving image by comparing a size predicted based on the world coordinates of the pattern and a reference size of the pattern; in response to a determination to calibrate the camera, determine relative world coordinates of the pattern with respect to a motion of the camera using images captured by the camera at different time points; transform the relative world coordinates of the pattern into absolute world coordinates of the pattern; and calibrate the camera using a corresponding relationship between the absolute world coordinates of the pattern and the image coordinates of the pattern.

For the determining the relative world coordinates of the pattern, the one or more processors may be configured to: determine motion information of the camera based on a corresponding relationship between patterns in images captured by the camera at the different time points; and determine the relative world coordinates of the pattern with respect to the motion of the camera using the corresponding relationship between the patterns and the motion information.

For the transforming the relative world coordinates of the pattern into the absolute world coordinates, the one or more processors may be configured to, in response to the pattern having the reference size, transform the relative world coordinates into the absolute world coordinates using the reference size.

For the transforming the relative world coordinates of the pattern into the absolute world coordinates, the one or more processors may be configured to, in response to the pattern having a reference range, transform the relative world coordinates into the absolute world coordinates based on a motion of the vehicle.

For the calibrating the camera, the one or more processors may be configured to, calibrate any one or any combination of any two or more of a pitch, a roll, and a height of the camera using the corresponding relationship between the absolute world coordinates of the pattern and the image coordinates of the pattern.

The preset pattern may include a standardized road mark comprised in the road on which the vehicle is traveling.

For the transforming the image coordinates of the pattern into the world coordinates, the one or more processors may be configured to transform the image coordinates of the pattern into the world coordinates based on a homography matrix.

For the transforming the image coordinates of the pattern into the world coordinates, the one or more processors may be configured to transform the image coordinates of the pattern into the world coordinates based on a parameter of the camera and a constraint that the pattern is on the surface of the road.

For the determining whether to calibrate the camera, the one or more processors may be configured to determine whether to calibrate the camera based on whether a difference between the predicted size of the pattern and the reference size exceeds a preset threshold.

The apparatus may be the vehicle, and the apparatus further may include the camera.

In another general aspect, a processor-implemented method with calibration includes: detecting a preset pattern in an image captured by a camera; determining whether to calibrate the camera by comparing a predicted size of the detected pattern and a preset reference threshold of the pattern; in response to determining to calibrate the camera, determining absolute world coordinates of the pattern using images captured by the camera at different time points; and calibrating the camera based on the absolute world coordinates.

The preset reference threshold may be a preset range, and the determining of whether to calibrate may include determining to calibrate the camera in response to the predicted size of the pattern being within the preset range.

The images captured by the camera at different time points may include the image in which the preset pattern is detected.

The determining of the absolute world coordinates may include: determining relative world coordinates of the pattern with respect to a motion of the camera, using images captured by the camera at different time points; and transforming the relative world coordinates of the pattern into the absolute world coordinates by removing a scale ambiguity of the relative world coordinates by matching a relative length of the relative world coordinates to a reference length of preset pattern information.

Other features and aspects will be apparent from the following detailed description, the drawings, and the claims.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known, after an understanding of the disclosure of this application, may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. It will be further understood that, as used herein, the terms "comprises," "includes," and "has" specify the presence of stated features, numbers, operations, members, elements, and/or combinations thereof, but do not preclude the presence or addition of one or more other features, numbers, operations, members, elements, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween. Likewise, similar expressions, for example, "between" and "immediately between," and "adjacent to" and "immediately adjacent to," are also to be construed in the same way. As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein.

Also, in the description of example embodiments, detailed description of structures or functions that are thereby known after an understanding of the disclosure of the present application will be omitted when it is deemed that such description will cause ambiguous interpretation of the example embodiments. Hereinafter, examples will be described in detail with reference to the accompanying drawings, and like reference numerals in the drawings refer to like elements throughout.

Figure 1:
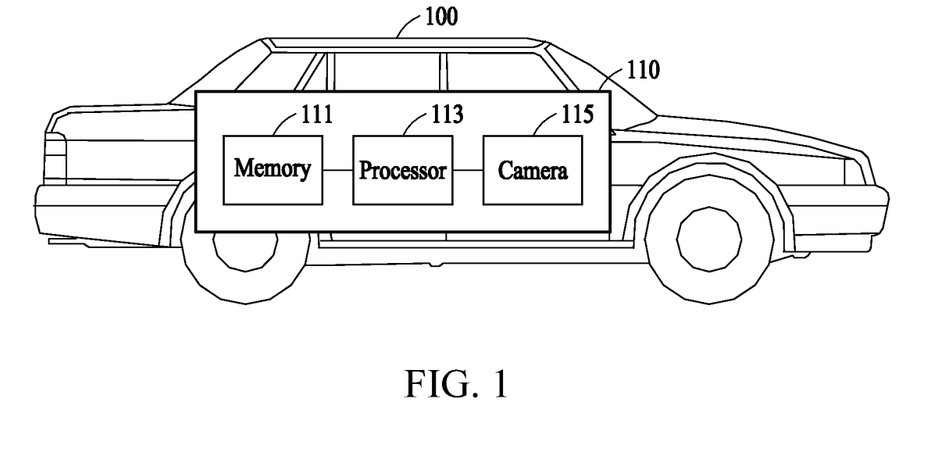
FIG. 1 illustrates an example of a calibration apparatus.

FIG. 1 illustrates an example of a calibration apparatus.

Referring to FIG. 1, a vehicle 100 may be or include all types of means of transportation traveling on a road or track. The vehicle 100 may be or include, for example, any of an automobile, a motorcycle, and the like, and the automobile may be or include various types such as any of a passenger car, a freight vehicle, and a two-wheeled vehicle. The vehicle 100 may also be or include any of an autonomous vehicle, an intelligent vehicle, and a vehicle equipped with a driving assistance system. The vehicle 100 described herein may be a vehicle equipped with a calibration apparatus 110. A nearby vehicle described herein may be a vehicle adjacent to the vehicle 100 in a front, rear, side, or oblique direction. The nearby vehicle may also include a vehicle being around the vehicle 100 with another vehicle intervening therebetween or a vehicle being around the vehicle 100 with a lane being unoccupied therebetween.

The calibration apparatus 110 may include a memory 111 (e.g., one or more memories), a processor 113 (e.g., one or more processors), and a camera 115 (e.g., one or more cameras). The vehicle 100 and/or the calibration apparatus 110 may perform any one or more or all of the operations and methods described herein.

The calibration apparatus 110 may perform camera calibration by detecting a preset pattern indicated on a surface of a road on which the vehicle 100 is traveling. The preset pattern described herein may be a standardized road surface mark on a driving road, and information on any one or any combination of any two or more of the shape, size, length, and area of the mark may be stored in the calibration device 110 and be utilized for a calibration operation to be described hereinafter. The preset pattern may include, as non-limiting examples, any of a crosswalk, a heading direction mark, a permitted left-turn mark, an indication sign, and the like. However, examples of the preset pattern are not limited to the foregoing examples, and the preset pattern may also include various standardized road marks that may differ by country or region and the description of the present disclosure may also be applied to these standardized road marks. The calibration apparatus 110 of one or more embodiments may perform camera calibration during actual driving (e.g., driving of the vehicle 100), thereby preventing an error that may occur due to a difference between a calibration time and a driving time, and thus improving technology (e.g., calibration, autonomous driving (AD), and/or advanced driver assistance system (ADAS) technology) for which the calibration apparatus 110 of one or more embodiments may be implemented. In addition, the calibration apparatus 110 may use a pattern on a road surface without a separate calibration tool to effectively obtain camera parameters suitable and/or accurate for an actual driving environment. Through the calibration apparatus 110, online calibration may be implemented, in that camera calibration may be performed during actual driving. Through the calibration apparatus 110, a position and a pose angle of the camera 115 attached to the vehicle 100 may be obtained (e.g., determined). Calibrated parameters may be used in an autonomous driving system and/or a driving assistance system of the vehicle 100.

Calibration may refer to a process of obtaining a camera parameter indicating a corresponding relationship between a point in a real world and each pixel in an image. Calibration may be an operation used for restoring world coordinates from an image (e.g. estimating an actual distance between a vehicle and a vehicle ahead in the image), and/or for obtaining a position onto which a point in the world is projected in the image. When a current environment of the vehicle 100 changes from an initial calibration environment during actual driving due to a factor (such as, for example, any of a change in the number of passengers on board, a change in tire pressure, and a change in a vehicle pose), the camera parameter may also change, and thus calibration may be performed again. However, unlike typical calibration operations, the calibration operation of one or more embodiments to be described hereinafter may be performed during driving, and thus the calibration environment and the actual driving environment may match and camera parameters suitable and/or accurate for the driving environment may be obtained, thereby improving technology (e.g., calibration, AD, and/or ADAS technology) for which the calibration apparatus 110 of one or more embodiments may be implemented.

An image captured by the camera 115 may be obtained as points in a three-dimensional (3D) space projected onto a two-dimensional (2D) plane image. A corresponding relationship between coordinates (x, y) on the 2D image and coordinates in the 3D space (that is, 3D coordinates (X, Y, Z) in a world domain) may be represented by Equation 1 below, for example.

$$s \begin{bmatrix} x \\ y \\ 1 \end{bmatrix} = \begin{bmatrix} f_x & skew\_cf_x & c_x \\ 0 & f_y & c_y \\ 0 & D & 1 \end{bmatrix} \begin{bmatrix} r_{11} & r_{12} & r_{13} & t_1 \\ r_{21} & r_{22} & r_{23} & t_2 \\ r_{31} & r_{32} & r_{33} & t_3 \end{bmatrix} \begin{bmatrix} X \\ Y \\ Z \\ 1 \end{bmatrix} = A[R|t] \begin{bmatrix} X \\ Y \\ Z \\ 1 \end{bmatrix}$$

Equation 1

In Equation 1 above, A represented by $$\begin{bmatrix} f_x & skew\_cf_x & c_x \\ 0 & f_y & c_y \\ 0 & D & 1 \end{bmatrix}$$

denotes an intrinsic parameter (such as, for example, a focal length, an aspect ratio, and a principal point of the camera 115 itself). $f_x$, $f_y$ denotes the focal length of the camera 115. $c_x$, $c_y$ denotes the principal point of the camera 115, and skew_$cf_x$ denotes a skew coefficient.

In addition, [R|t] represented by $$\begin{bmatrix} r_{11} & r_{12} & r_{13} & t_1 \\ r_{21} & r_{22} & r_{23} & t_2 \\ r_{31} & r_{32} & r_{33} & t_3 \end{bmatrix}$$

denotes an extrinsic parameter that is associated with a geometrical relationship between the camera 115 and an external space (for example, an installation height and a direction (e.g., pan and tilt) of the camera 115). $r_{11}$ to $r_{33}$ are elements representing a rotation of the camera 115 and may be decomposed into pitch, roll, and yaw. $t_1$ to $t_3$ are elements representing a translation of the camera 115.

The image coordinates may be represented by an x-axis value and a y-axis value with respect to a reference point (e.g., an upper left end) of the image captured by the camera 115, and the world coordinates may be represented by an x-axis value, a y-axis value, and a z-axis value with respect to a feature point (e.g., a center point) of the vehicle 100.

Although to be described in detail hereinafter, the calibration apparatus 110 may adjust any one or any combination of any two or more of a pitch value, a roll value, and a height value of the camera 115 through the calibration operation described below.

The memory 111 may include computer-readable instructions. The processor 113 may be configured to perform any one or more or all operations to be described hereinafter when the instructions stored in the memory 111 are executed by the processor 113. The memory 111 may be a volatile or nonvolatile memory.

The processor 113 may be a device that executes instructions or programs or controls the calibration apparatus 110 and may be or include, for example, a central processing unit (CPU) and/or a graphics processing unit (GPU).

The processor 113 may transform a standardized road surface pattern detected from an image captured in an actual driving environment into world coordinates to estimate a size of the pattern, and then determine whether to perform calibration based on a determined error between the estimated size of the pattern and an actual standard. For example, the processor 113 may transform image coordinates of the road surface pattern into the world coordinates using structure from motion (SFM) and actual standard information, and perform calibration on the camera 115 based on a corresponding relationship between the world coordinates and the image coordinates.

The camera 115 may output an image by capturing a scene in front or in a traveling direction of the vehicle 100. The image captured by the camera 115 may be transmitted to the processor 113.

Although the camera 115 is illustrated as being included in or as a component of the calibration apparatus 110 in the example of FIG. 1, examples are not limited thereto. For another example, the calibration apparatus 110 may receive an image from an external camera and perform calibration based on the received image. Even in such an example, the description of the present disclosure may also be applied. In addition, although the calibration apparatus 110 is illustrated as being provided in or as a component of the vehicle 100 in the example of FIG. 1, examples are not limited thereto. For another example, an image captured by the camera 115 provided in the vehicle 100 may be transmitted to the calibration apparatus 110 provided outside the vehicle 100 and calibration may then be performed. In this example, the calibration apparatus 110 may be implemented in or as various computing devices, for example, any of a mobile phone, a smartphone, a personal computer (PC), a tablet PC, a laptop, a remote server, and the like.

Figure 2:
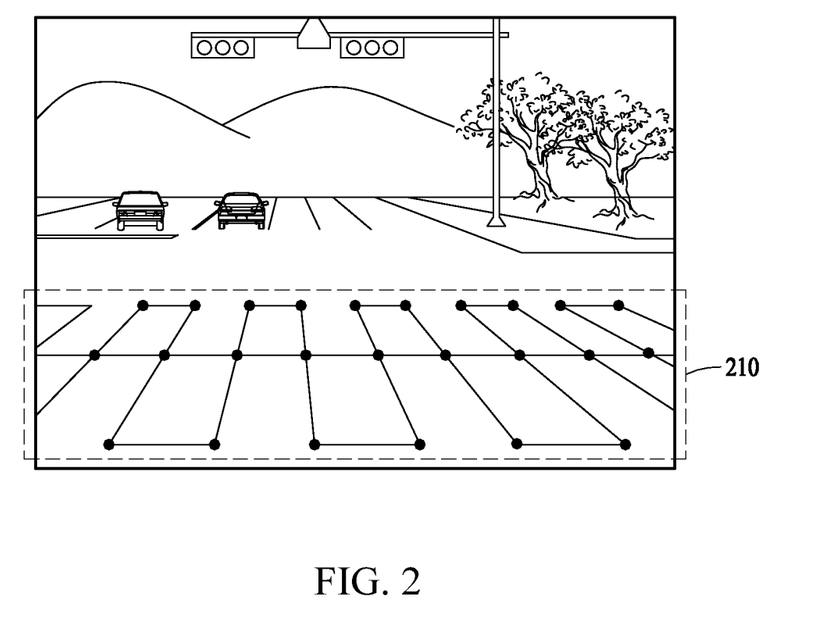
FIG. 2 illustrates an example of detecting a preset pattern from a driving image.

FIG. 2 illustrates an example of detecting a preset pattern from a driving image.

Referring to FIG. 2, an image captured by a camera provided in a vehicle may include a preset pattern 210.

A calibration apparatus may detect the pattern 210 from the image. For example, the calibration apparatus may detect the pattern 210 from the image through a segmentation method and/or an edge detection method. When the calibration apparatus is configured to use a high-definition (HD) map, the calibration apparatus may use a vehicle position identified through localization and information stored in the HD map to recognize the presence of the pattern 210 ahead and effectively detect the pattern 210. The HD map may be a map including information on detailed roads and surrounding geographical features. The HD map may include, for example, 3D information of any of traffic lights, signs, curbs, road marks, and various structures, in addition to lane-unit information.

The calibration apparatus may extract a corner point from the detected pattern 210. In the example of FIG. 2, the calibration apparatus may extract corner points of blocks included in a crosswalk. For example, the calibration apparatus may extract one or more corner points of the pattern 210 using a Harris corner detection method. A corner point may correspond to a feature of a pattern, and may also be referred to as a feature point. A corner point may be extracted from an image and may be represented by image coordinates in an image domain.

The calibration apparatus may transform image coordinates of corner points of the pattern 210 into world coordinates in a world domain. For example, the calibration apparatus may transform the image coordinates of the pattern 210 into the world coordinates using a homography matrix. The homography matrix may represent a transformation relationship or corresponding relationship established between corresponding points projected when one plane is projected onto another plane. The homography matrix may be determined by a camera parameter. For another example, the calibration apparatus may transform the image coordinates of the pattern 210 into the world coordinates using a camera parameter and a preset constraint. 3D world coordinates may be transformed into 2D image coordinates relatively simply through a process of projecting them onto an image plane. However, to transform the 2D image coordinates into the 3D world coordinates, additional information may be used. When a constraint indicating that the detected pattern 210 is on a surface of a road is used as such additional information, the image coordinates of the pattern 210 may be transformed into the world coordinates.

The calibration apparatus may predict a size of the pattern 210 based on the world coordinates of the pattern 210. The calibration apparatus may calculate a difference between the predicted size of the pattern 210 and a reference size of the pattern 210, and determine, based on the difference, whether to perform camera calibration. The preset pattern 210 may be a standardized road surface mark, and the reference size according to a related standard may be compared to the predicted size. The reference size may be stored in an internal or external memory of the calibration apparatus, and may be verified from the HD map when the HD map is available or determined to be used. For example, when the difference is greater than a threshold, the calibration apparatus may determine to perform camera calibration. In contrast, when the difference is less than or equal to the threshold, the calibration apparatus may determine not to perform camera calibration and/or continue to use a current calibration value without performing camera calibration. In another example, when the predicted size of the pattern 210 is within a reference range of the pattern 210, the calibration apparatus may determine to perform camera calibration, and when the predicted size is not within the range, the calibration apparatus may determine not to perform camera calibration and/or continue to use a current calibration value without performing camera calibration.

Figure 3:
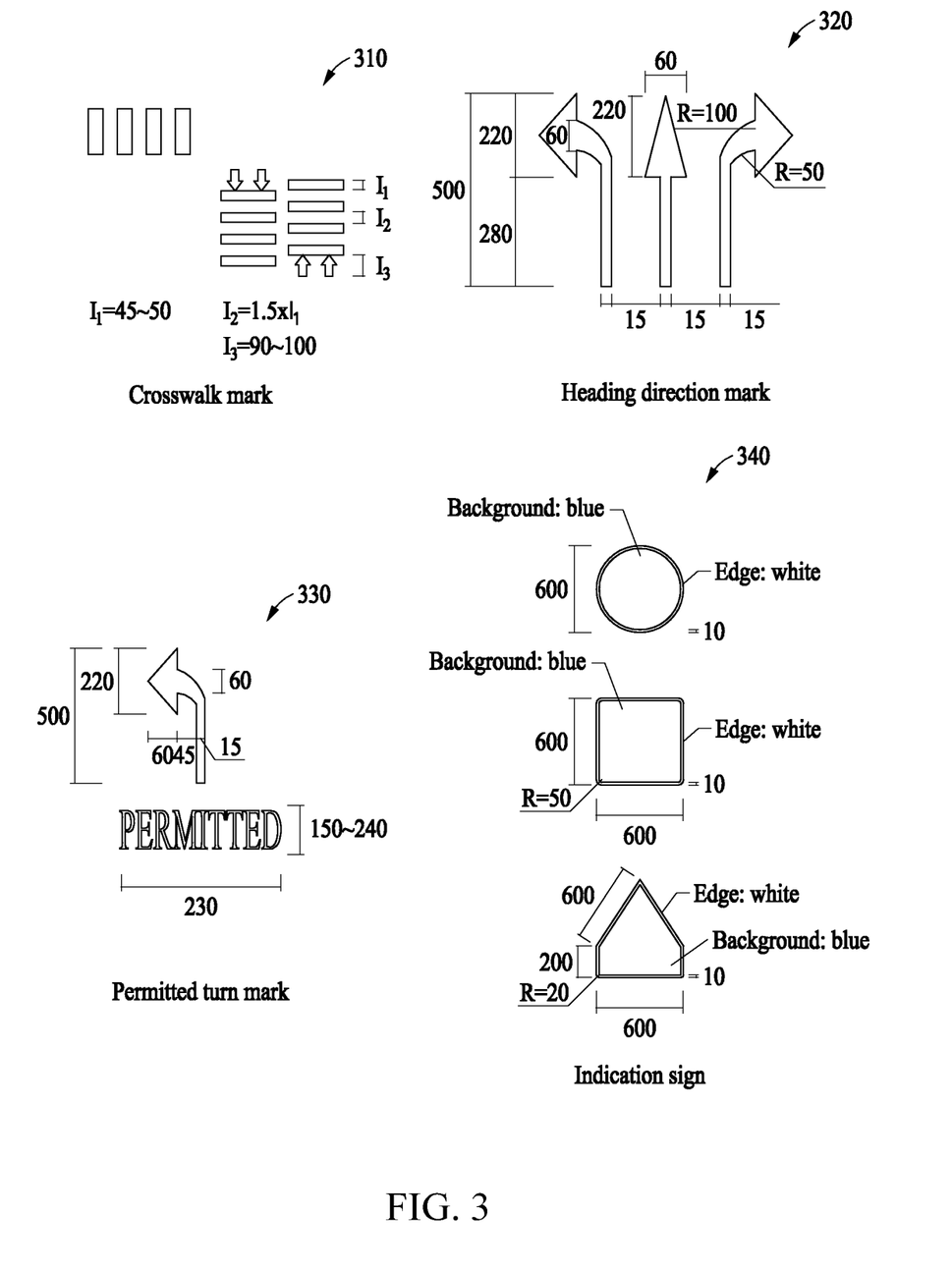
FIG. 3 illustrates examples of preset patterns.

FIG. 3 illustrates examples of preset patterns.

Referring to FIG. 3, illustrated are various standardized patterns on a surface of a road. Various marks of sizes determined by traffic regulations and rules (for example, a crosswalk mark 310, a heading direction mark 320, a permitted turn mark 330, and an indication sign 340) may be present on the surface of the road. In the example of FIG. 2, a crosswalk is illustrated as an example for the convenience of description. However, various road surface patterns (such as, for example, any of the heading direction mark 320, the permitted turn mark 330, the indication sign 340, a lane, a stop line, a guide line, and the like) may also be used.

A thickness $l_1$ of a block of the crosswalk mark 310 may have a reference range of 45 to 50 centimeters (cm). That is, a pattern may have a reference range including an upper limit and a lower limit. In an example, a reference size used to determine whether to perform the calibration as described above may be determined to be a median value or an average value of the reference range.

As illustrated in FIG. 3, the heading direction mark 320, the permitted turn mark 330, and the indication sign 340 may have respective reference sizes.

Figure 4:
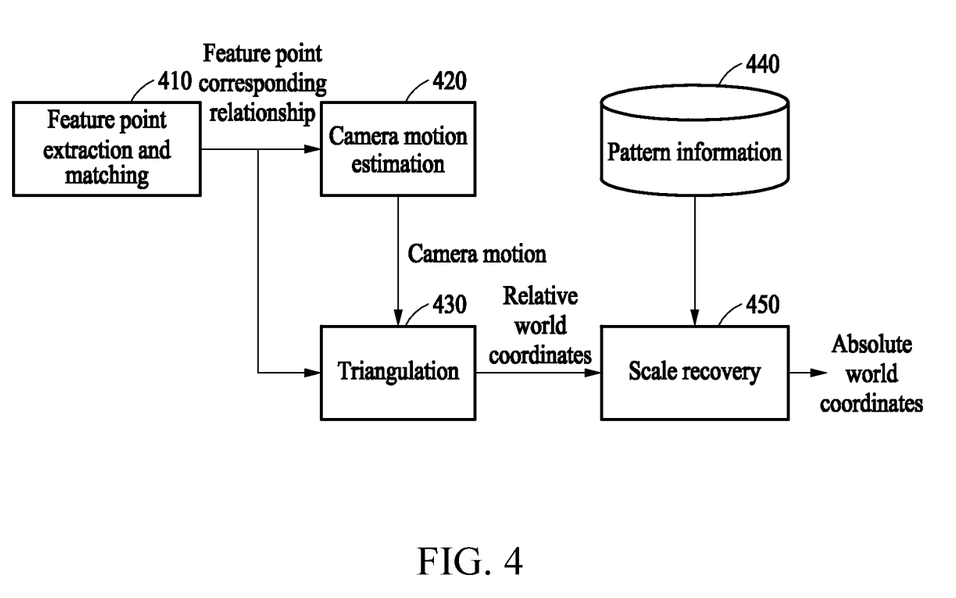
FIG. 4 illustrates an example of obtaining absolute world coordinates of a pattern based on structure from motion (SFM).

FIG. 4 illustrates an example of obtaining absolute world coordinates of a pattern based on SFM.

Referring to FIG. 4, absolute world coordinates of a pattern used to perform calibration may be obtained by performing operations to be described hereinafter, and SFM may be used to perform the operations. SFM may refer to a method of obtaining motion information (e.g., rotation and/or translation matrices) between images using a corresponding relationship between feature points in the images, and obtaining actual 3D points of the feature points through triangulation.

In operation 410, a calibration apparatus may determine a corresponding relationship between patterns in images captured by a camera at different time points. When the same camera captures images at different time points while a vehicle is driving or traveling, the images captured by the camera may be obtained from different positions for the same scene. For example, the calibration apparatus may detect a pattern in a first image captured at a time t, and extract corner points as first feature points from the detected pattern. The calibration apparatus may also detect a pattern in a second image captured at a time t+a (a>0), and extract corner points as second feature points from the detected pattern. The calibration apparatus may match identical (or corresponding) points between the first feature points and the second feature points, and determine a corresponding relationship between the feature points. In an example, the identical points may be points corresponding to a same part of a same pattern, where the same pattern is included in both the first image and the second image.

In operation 420, the calibration apparatus may estimate a motion of the camera based on such a feature point corresponding relationship between the first image and the second image. For example, the calibration apparatus may estimate translation and rotation information of the camera using the feature point corresponding relationship.

In operation 430, the calibration apparatus may determine relative world coordinates of the pattern with respect to the motion of the camera based on the feature point corresponding relationship and the motion of the camera. In this case, when an actual movement distance between the time t and the time t+a is unknown or undetermined, the relative world coordinates to which a scale is not applied may be determined. For example, when the motion of the camera is denoted as k, the relative world coordinates of the pattern may be determined to be proportional to k, as in (kx, ky, kz). The relative world coordinates may have values to which the scale is not applied, and may thus be referred to as 3D points with scale ambiguity.

In operation 450, the calibration apparatus may obtain absolute world coordinates by removing the scale ambiguity of the relative world coordinates using pattern information 440. The calibration apparatus may transform the relative world coordinates into the absolute world coordinates by matching a relative length determined based on the relative world coordinates to a reference length of the pattern stored in the pattern information 440. For example, the pattern information 440 may be standardized and prestored pattern information or pattern information stored in an HD map.

For example, when the pattern (for example, a crosswalk) has a reference range as described above, the scale ambiguity of the relative world coordinates may be removed based on a motion or movement of the vehicle. A motion of the vehicle that is determined based on a driving distance and a driving direction of the vehicle from the time t to the time t+a may be the same as a motion of the camera provided in the vehicle. The calibration apparatus may determine the camera motion k using the motion of the vehicle, and determine the absolute world coordinates by applying the camera motion k to the relative world coordinates.

Figure 5:
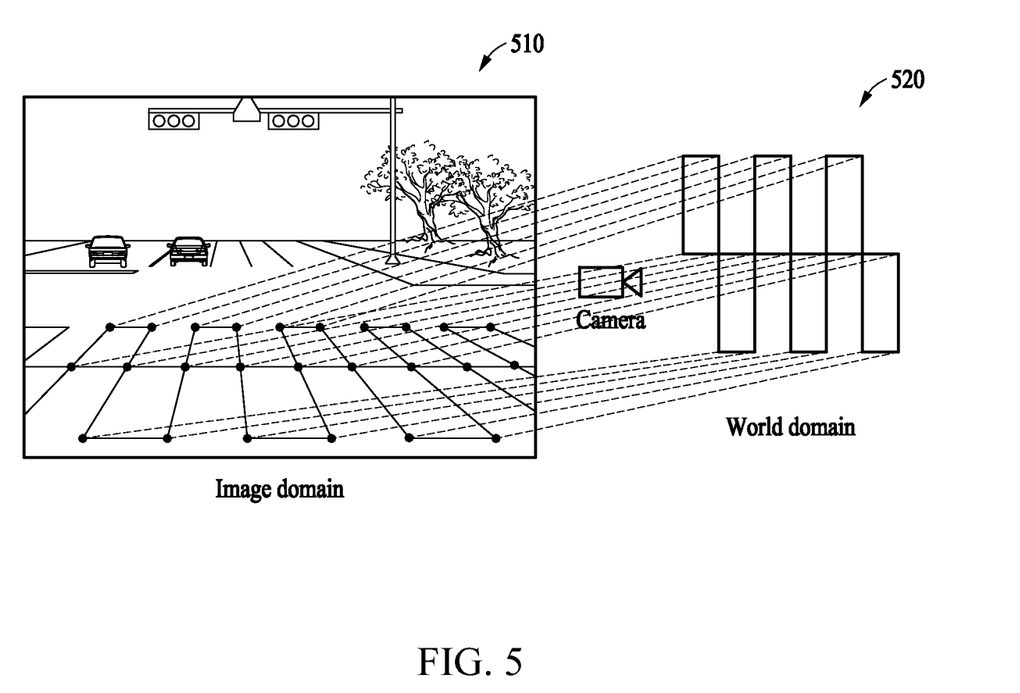
FIG. 5 illustrates an example of performing calibration.

FIG. 5 illustrates an example of performing calibration.

Referring to FIG. 5, a calibration apparatus may calibrate a camera using a corresponding relationship between absolute world coordinates of a pattern and image coordinates of the pattern. In the example of FIG. 5, image coordinates on a left side 510 and world coordinates on a right side 520 may correspond to each other.

The calibration apparatus may update any one or any combination of any two or more of a pitch value, a roll value, and a height value among camera parameters through calibration. In general, a movement of a vehicle in an x-axis or y-axis may not change much, and pitch, roll, and height may change due to a change in tire pressure or in weight of passengers on board. Thus, these may be updated through calibration. However, updating the parameters in association with an x-axis and y-axis movement may also be performed.

Figure 6:
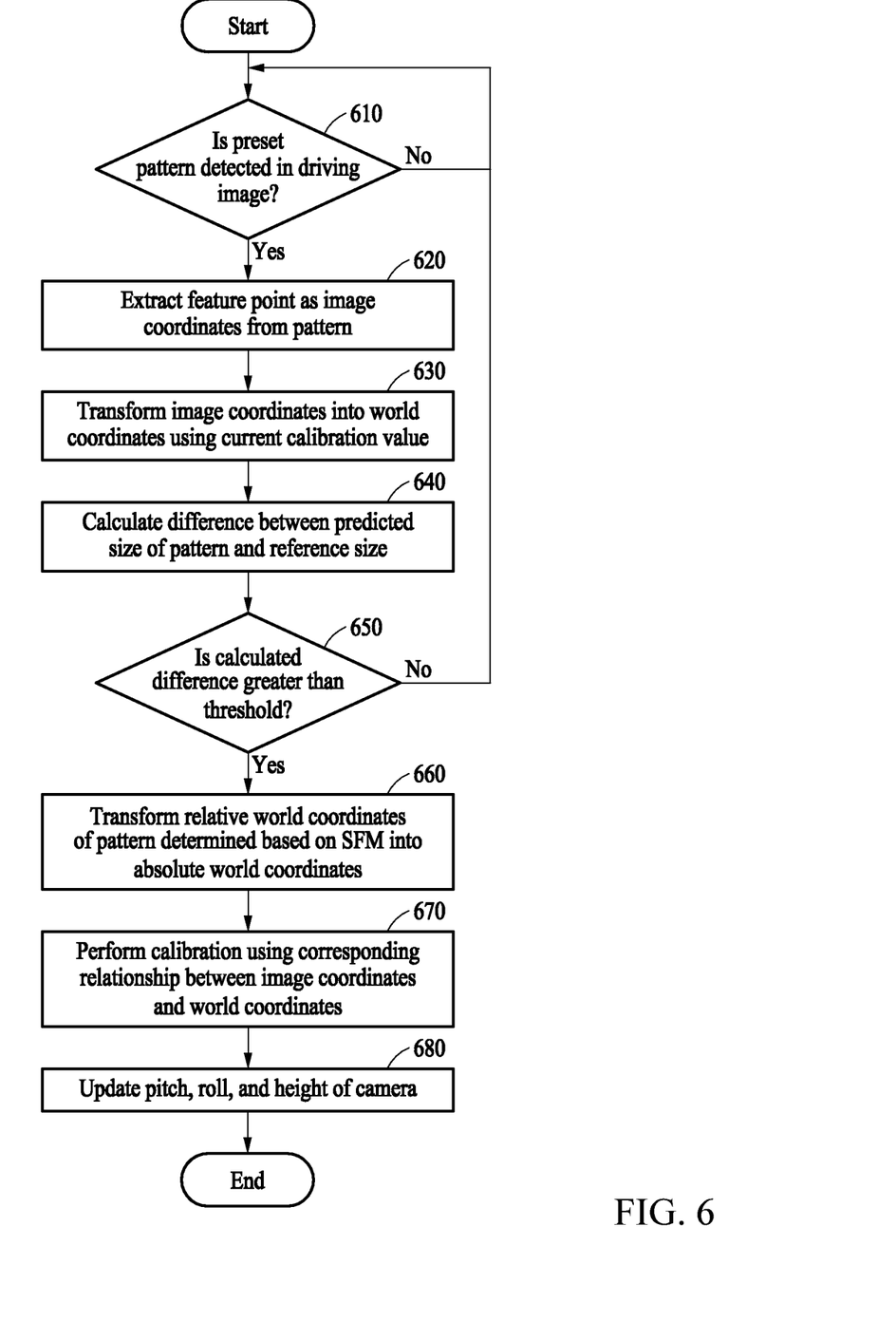
FIG. 6 illustrates an example of a calibration method.

FIG. 6 illustrates an example of a calibration method.

A calibration method performed by a processor included in a calibration apparatus will be described hereinafter with reference to FIG. 6.

Referring to FIG. 6, in operation 610, the calibration apparatus may determine whether a preset pattern is detected in a driving image. The calibration apparatus may determine whether a preset pattern is detected from a driving image captured by a camera based on a segmentation method and/or edge detection method. When the pattern is not detected from the driving image, operation 610 may be performed again. Conversely, when the pattern is detected from the driving image, operation 620 may be subsequently performed.

In operation 620, the calibration apparatus may extract a feature point as image coordinates from the pattern.

For example, the calibration apparatus may determine whether six or more feature points are extracted as corner points from the pattern extracted from the driving image. This is because six or more feature points may be used to determine a translation and rotation in x-axis, y-axis, and z-axis directions through calibration. Thus, the calibration apparatus may determine whether the six or more feature points are extracted from the detected pattern. For example, when the six or more feature points are not extracted because the pattern is occluded or hidden by nearby vehicles or other objects or the pattern is worn and blurred, operation 610 may be performed again. Conversely, when the six or more feature points are extracted from the pattern, operation 630 may be subsequently performed. However, examples are not limited thereto, and, according to other non-limiting examples, operation 630 may be subsequently performed when less or more than six feature points are extracted from the pattern. For example, when less than six feature points are extracted from the pattern, additional feature points may be predicted for the pattern based on the extracted feature points, such that a total amount of extracted and predicted feature points is six or more, and operation 630 may be subsequently performed based on the extracted and predicted feature points.

In operation 630, the calibration apparatus may transform the image coordinates into world coordinates using a current calibration value. In this case, a constraint indicating that the pattern is on a surface of a road may be used as additional information. In another example, the calibration apparatus may transform the image coordinates of the pattern into the world coordinates using a homography matrix.

In operation 640, the calibration apparatus may calculate a difference between a predicted size of the pattern and a reference size of the pattern. The reference size may be a standardized size of the pattern that is stored in advance in a memory or identified from an HD map.

In operation 650, the calibration apparatus may determine whether the calculated difference exceeds a threshold. When the calculated difference is less than or equal to the threshold, the calibration may be determined to be unnecessary, and operation 610 may be subsequently performed. Conversely, when the calculated difference is greater than the threshold, the calibration may be determined to be necessary, and operation 660 may be subsequently performed. For example, the threshold may be set to be 10% of the reference size. However, other various standards may be set according to circumstances and regions.

In operation 660, the calibration apparatus may transform relative world coordinates of the pattern determined based on SFM into absolute world coordinates. The calibration apparatus may determine the relative world coordinates of the pattern with respect to a motion of the camera by using images captured by the camera at different time points. The calibration apparatus may transform the relative world coordinates of the pattern into the absolute world coordinates based on the reference size of the pattern and/or a motion of the vehicle.

In operation 670, the calibration apparatus may perform calibration using a corresponding relationship between the image coordinates of the pattern and the world coordinates of the pattern.

In operation 680, the calibration apparatus may update any one or any combination of any two or more of pitch, roll, and height of the camera. In a non-limiting example, in operation 680, the calibration apparatus further may further include estimating either one or both of a pose of the vehicle and a distance to another vehicle, based on an image captured using the camera with the any one or any combination of any two or more of the updated pitch, the updated roll, and the updated height of the camera.

For a more detailed description of the operations described above with reference to FIG. 6, reference may be made to what is described above with reference to FIGS. 1 through 5, and thus a more detailed and repeated description thereof will be omitted here.

The vehicles, calibration apparatuses, memories, processors, cameras, vehicle 100, calibration apparatus 110, memory 111, processor 113, camera 115, and other apparatuses, devices, units, modules, and components described herein with respect to FIGS. 1-6 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-6 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

What is claimed is:

1. A processor-implemented method with calibration, comprising:
    detecting a preset pattern comprised in a surface of a road from a driving image of a vehicle;
    transforming image coordinates in an image domain of the pattern into world coordinates in a world domain;
    determining whether to calibrate a camera capturing the driving image by comparing a size predicted based on the world coordinates of the pattern and a reference size of the pattern, wherein in response to a determination that a difference between the predicted size of the pattern and the reference size of the pattern is not greater than a preset threshold, the method terminates calibrating the camera;
    in response to a determination to calibrate the camera, determining relative world coordinates of the pattern with respect to a motion of the camera, the motion of the camera determined based on a corresponding relationship between patterns in images captured by the camera at different time points;
    transforming the relative world coordinates of the pattern into absolute world coordinates of the pattern; and calibrating the camera using a corresponding relationship between the absolute world coordinates of the pattern and the image coordinates of the pattern.

2. The method of claim 1, wherein the determining the relative world coordinates of the pattern comprises:
   determining motion information of the camera based on the corresponding relationship between patterns in the images captured by the camera at the different time points; and
   determining the relative world coordinates of the pattern with respect to the motion of the camera using the corresponding relationship between the patterns and the motion information.

3. The method of claim 1, wherein the transforming the relative world coordinates of the pattern into the absolute world coordinates comprises:
   in response to the pattern having the reference size, transforming the relative world coordinates into the absolute world coordinates using the reference size.

4. The method of claim 1, wherein the transforming the relative world coordinates of the pattern into the absolute world coordinates comprises:
   in response to the pattern having a reference range, transforming the relative world coordinates into the absolute world coordinates based on a motion of the vehicle.

5. The method of claim 1, wherein the calibrating the camera comprises:
   calibrating any one or any combination of any two or more of a pitch, a roll, and a height of the camera using the corresponding relationship between the absolute world coordinates of the pattern and the image coordinates of the pattern.

6. The method of claim 1, wherein the preset pattern comprises a standardized road mark comprised in the road on which the vehicle is traveling.

7. The method of claim 1, wherein the transforming the image coordinates of the pattern into the world coordinates comprises:
   transforming the image coordinates of the pattern into the world coordinates based on a homography matrix.

8. The method of claim 1, wherein the transforming the image coordinates of the pattern into the world coordinates comprises:
   transforming the image coordinates of the pattern into the world coordinates based on a parameter of the camera and a constraint that the pattern is on the surface of the road.

9. The method of claim 1, wherein the determining whether to calibrate the camera comprises:
   determining to calibrate the camera in response to a determination that the difference between the predicted size of the pattern and the reference size exceeds the preset threshold.

10. The method of claim 1, further comprising:
    determining whether a preset number of feature points are extracted from the preset pattern.

11. The method of claim 1, further comprising estimating either one or both of a pose of the vehicle and a distance to another vehicle, based on an image captured using the calibrated camera.

12. A non-transitory computer-readable storage medium storing instructions that, when executed by one or more processors, configure the one or more processors to perform the method of claim 1.

13. An apparatus with calibration, comprising:
    one or more processors configured to:
    detect a preset pattern comprised in a surface of a road from a driving image of a vehicle;
    transform image coordinates in an image domain of the pattern into world coordinates in a world domain;
    determine whether to calibrate a camera capturing the driving image by comparing a size predicted based on the world coordinates of the pattern and a reference size of the pattern,
    wherein in response to a determination that a difference between the predicted size of the pattern and the reference size of the pattern is not greater than a preset threshold, the one or more processors are configured to terminate calibrating the camera;
    in response to a determination to calibrate the camera, determine relative world coordinates of the pattern with respect to a motion of the camera, the motion of the camera determined based on a corresponding relationship between patterns in images captured by the camera at different time points;
    transform the relative world coordinates of the pattern into absolute world coordinates of the pattern; and
    calibrate the camera using a corresponding relationship between the absolute world coordinates of the pattern and the image coordinates of the pattern.

14. The apparatus of claim 13, wherein, for the determining the relative world coordinates of the pattern, the one or more processors are configured to:
    determine motion information of the camera based on the corresponding relationship between patterns in images captured by the camera at the different time points; and
    determine the relative world coordinates of the pattern with respect to the motion of the camera using the corresponding relationship between the patterns and the motion information.

15. The apparatus of claim 13, wherein, for the transforming the relative world coordinates of the pattern into the absolute world coordinates, the one or more processors are configured to:
    in response to the pattern having the reference size, transform the relative world coordinates into the absolute world coordinates using the reference size.

16. The apparatus of claim 13, wherein the apparatus is the vehicle, and the apparatus further comprises the camera.

17. A processor-implemented method with calibration, comprising:
    detecting a preset pattern in an image captured by a camera;
    determining whether to calibrate the camera by comparing a predicted size of the detected pattern and a preset reference threshold of the pattern,
    wherein in response to a determination that a difference between the predicted size of the pattern and the reference size of the pattern is not greater than a preset threshold, the method terminates calibrating the camera;
    in response to determining to calibrate the camera, determining absolute world coordinates of the pattern using a motion of the camera, the motion of the camera estimated based on a corresponding relationship between patterns in images captured by the camera at different time points; and
    calibrating the camera based on the absolute world coordinates.

18. The method of claim 17, wherein the preset reference threshold is a preset range, and the determining of whether to calibrate comprises determining to calibrate the camera in response to the predicted size of the pattern being within the preset range.

19. The method of claim 17, wherein the images captured by the camera at different time points include the image in which the preset pattern is detected.

20. The method of claim 17, wherein the determining of the absolute world coordinates comprises:
   determining relative world coordinates of the pattern with respect to the motion of the camera, using the images captured by the camera at the different time points; and
   transforming the relative world coordinates of the pattern into the absolute world coordinates by removing a scale ambiguity of the relative world coordinates by matching a relative length of the relative world coordinates to a reference length of preset pattern information.

* * * * *